US011947282B2

(12) United States Patent
Chapman et al.

(10) Patent No.: US 11,947,282 B2
(45) **Date of Patent: *Apr. 2, 2024**

(54) TONER LEVEL SENSING USING TONER CONTAINER VIBRATION

(71) Applicant: LEXMARK INTERNATIONAL, INC., Lexington, KY (US)

(72) Inventors: Alexander Lloyd Chapman, Lexington, KY (US); Clare Cabahug Maxino, Cebu (PH); Neilson Gutay Navarrete, Mandaue (PH); Michael Todd Phillips, Frankfort, KY (US); Scott Daniel Reeves, Louisville, CO (US); Daniel Lee Thomas, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 105 days.

This patent is subject to a terminal disclaimer.

(21) Appl. No.: 17/701,758

(22) Filed: Mar. 23, 2022

(65) Prior Publication Data

US 2023/0305434 A1 Sep. 28, 2023

(51) Int. Cl.
*G03G 15/08* (2006.01)
*G03G 15/00* (2006.01)
(Continued)

(52) U.S. Cl.
CPC ..... *G03G 15/0868* (2013.01); *G03G 15/0848* (2013.01); *G03G 15/0856* (2013.01);
(Continued)

(58) Field of Classification Search
CPC ........... G03G 15/0848; G03G 15/0856; G03G 15/0858; G03G 15/086; G03G 15/0868;
(Continued)

(56) References Cited

U.S. PATENT DOCUMENTS 4,159,786 A 7/1979 Biddle, III et al.
4,314,242 A 2/1982 Kuru et al.
(Continued)

FOREIGN PATENT DOCUMENTS

GB 2421320 A 6/2005
JP 11338239 A * 12/1999
(Continued)

OTHER PUBLICATIONS

U.S. Appl. No. 17/701,762, filed Mar. 23, 2022 (Chapman et al.).
(Continued)

*Primary Examiner* — Joseph S Wong

(57) ABSTRACT

A system for an electrophotographic image forming device includes a toner container having a reservoir for storing toner and an impact member configured to selectively impart an impulse force on the toner container to cause vibration of the toner container. A sensor is configured to sense the vibration of the toner container upon the impact member imparting the impulse force on the toner container. Processing circuitry in communication with the sensor is configured to determine an estimate of an amount of toner in the reservoir based on the sensed vibration of the toner container.

11 Claims, 9 Drawing Sheets

(51) Int. Cl.
*G03G 21/10* (2006.01)
*G03G 21/12* (2006.01)

(52) U.S. Cl.
CPC ....... *G03G 15/0858* (2013.01); *G03G 15/086* (2013.01); *G03G 15/556* (2013.01); *G03G 21/10* (2013.01); *G03G 21/12* (2013.01); *G03G 2215/00637* (2013.01); *G03G 2215/00645* (2013.01); *G03G 2215/0154* (2013.01); *G03G 2215/0888* (2013.01); *G03G 2221/0021* (2013.01)

(58) Field of Classification Search
CPC ...... G03G 15/556; G03G 21/10; G03G 21/12; G03G 2215/00637; G03G 2215/00645; G03G 2215/0154; G03G 2215/0888; G03G 2221/0021
See application file for complete search history.

(56) References Cited

U.S. PATENT DOCUMENTS

| | | | | |
|---|---|---|---|---|
| 5,634,169 | A | | 5/1997 | Barry et al. |
| 5,862,431 | A | | 1/1999 | Christensen |
| 6,215,974 | B1 | | 4/2001 | Katoh et al. |
| 6,246,841 | B1 | | 6/2001 | Merrifield et al. |
| 6,463,254 | B1 | | 10/2002 | Maul et al. |
| 6,496,662 | B1 | | 12/2002 | Buchanan et al. |
| 6,510,291 | B2 | | 1/2003 | Campbell et al. |
| 6,580,881 | B2 | | 6/2003 | Coriale et al. |
| 6,600,882 | B1 | | 7/2003 | Applegate et al. |
| 6,819,884 | B1 | | 11/2004 | Carter et al. |
| 7,139,505 | B2 | | 11/2006 | Askren et al. |
| 7,555,231 | B2 | | 6/2009 | Etter et al. |
| 8,718,496 | B2 | | 5/2014 | Barry et al. |
| 8,989,611 | B2 | | 3/2015 | Leemhuis et al. |
| 9,389,582 | B2 | | 7/2016 | Carpenter et al. |
| 9,519,243 | B2 | | 12/2016 | Carpenter et al. |
| 9,632,477 | B1 | | 4/2017 | Bejat et al. |
| 9,910,382 | B1 | | 3/2018 | Barry et al. |
| 10,345,736 | B1 | | 7/2019 | Leemhuis |
| 10,429,765 | B1 | | 10/2019 | Leemhuis |
| 10,466,617 | B2 | | 11/2019 | Tonges et al. |
| 2016/0170328 | A1 | * | 6/2016 | Hosokawa ......... G03G 15/0858 399/27 |
| 2018/0188670 | A1 | | 7/2018 | Ando |
| 2019/0196360 | A1 | | 6/2019 | Inokuchi et al. |
| 2021/0364968 | A1 | * | 11/2021 | Kobayashi ......... G03G 15/0887 |

FOREIGN PATENT DOCUMENTS

| | | | | |
|---|---|---|---|---|
| JP | 2009251329 | A | | 10/2009 |
| JP | 2014106357 | A | * | 6/2014 |
| JP | 2017191182 | A | | 10/2017 |

OTHER PUBLICATIONS

Adrian Garcia, et al., Non-Intrusive Tank-Filling Sensor Based on Sound Resonance, Electronics 2018, 7, 378, published Dec. 3, 2018.
Emile S. Webster and Clive E. Davies, The Use of Helmholtz Resonance for Measuring the Volume of Liquids and Solids, Sensors 2010, 10, 10663-10672, published Nov. 30, 2010.
T. Nishizu, et al., Automatic, Continuous Food Volume Measurement with a Helmholtz Resonator, Agricultural Engineering International : the CIGR Journal of Scientific Research and Development, Manuscript FP 01 004, vol. III, published Oct. 1, 2001.
Takahisa Nishizu and Shozo Kawada, Volume Measurement by using Helmholtz Acoustic Resonance for Porous Produce and Foods—Real-time Measurement of Bread Dough Volume in Fermentation Process, Key Engineering Materials, vols. 321-323, 1151-1156, published Oct. 15, 2006.
Non-Final Office Action dated Jul. 18, 2023 for U.S. Appl. No. 17/701,762 (Chapman et al.).

* cited by examiner

TONER LEVEL SENSING USING TONER CONTAINER VIBRATION

CROSS REFERENCES TO RELATED APPLICATIONS

None.

BACKGROUND

1. Field of the Disclosure

The present disclosure relates generally to image forming devices and more particularly to a toner level sensing assembly using toner container vibration.

2. Description of the Related Art

During the electrophotographic printing process, an electrically charged rotating photoconductive drum is selectively exposed to a laser beam. The areas of the photoconductive drum exposed to the laser beam are discharged creating an electrostatic latent image of a page to be printed on the photoconductive drum. Toner particles are then electrostatically picked up by the latent image on the photoconductive drum creating a toned image on the drum. The toned image is transferred to the print media (e.g., paper) either directly by the photoconductive drum or indirectly by an intermediate transfer member. The toner is then fused to the media using heat and pressure to complete the print.

The image forming device's toner supply is typically stored in one or more replaceable units installed in the image forming device. As these replaceable units run out of toner, the units must be replaced or refilled in order to continue printing. As a result, it is desired to measure the amount of toner remaining in these units in order to warn the user that one of the replaceable units is near an empty state or to prevent printing after one of the units is empty in order to prevent damage to the image forming device. Some image forming devices also include one or more replaceable units that store waste toner removed from the photoconductive drum. As these replaceable units fill with toner, the units must be replaced or emptied in order to continue printing. As a result, it is desired to measure the amount of toner in these units in order to warn the user that one of the replaceable units is near a full state or to prevent printing after one of the units is full in order to prevent damage to the image forming device. Accordingly, a system for measuring the amount of toner in a replaceable unit of an image forming device is desired.

SUMMARY

A system for an electrophotographic image forming device according to one example embodiment includes a toner container having a reservoir for storing toner and an impact member configured to selectively impart an impulse force on the toner container to cause vibration of the toner container. A sensor is configured to sense the vibration of the toner container upon the impact member imparting the impulse force on the toner container. Processing circuitry in communication with the sensor is configured to determine an estimate of an amount of toner in the reservoir based on the sensed vibration of the toner container.

A toner container for an electrophotographic image forming device according to another example embodiment includes a housing having a reservoir for storing toner, the housing having an engagement surface for receiving an impulse force from an impact member of the image forming device when the toner container is installed in the image forming device. A sensor is positioned on the housing and configured to sense vibration of the housing upon the housing receiving the impulse force from the impact member of the image forming device. The sensed vibration of the housing is indicative of an amount of toner in the reservoir. An electrical contact is electrically connected to the sensor and positioned on the housing. The electrical contact is positioned to engage a corresponding electrical contact of the image forming device when the toner container is installed in the image forming device to allow the sensor to transmit an electrical signal corresponding to the sensed vibration to processing circuitry of the image forming device upon the housing receiving the impulse force from the impact member of the image forming device.

A method for estimating an amount of toner in a toner container of an electrophotographic image forming device according to another example embodiment includes selectively generating an impulse force to cause vibration of the toner container and sensing, by a sensor, the vibration of the toner container. The method further includes determining, by processing circuitry, an estimate of the amount of toner in the toner container based on the sensed vibration of the toner container.

BRIEF DESCRIPTION OF THE DRAWINGS

The accompanying drawings incorporated in and forming a part of the specification, illustrate several aspects of the present disclosure, and together with the description serve to explain the principles of the present disclosure.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense, and the scope of the present disclosure is defined only by the appended claims and their equivalents.

Figure 1:
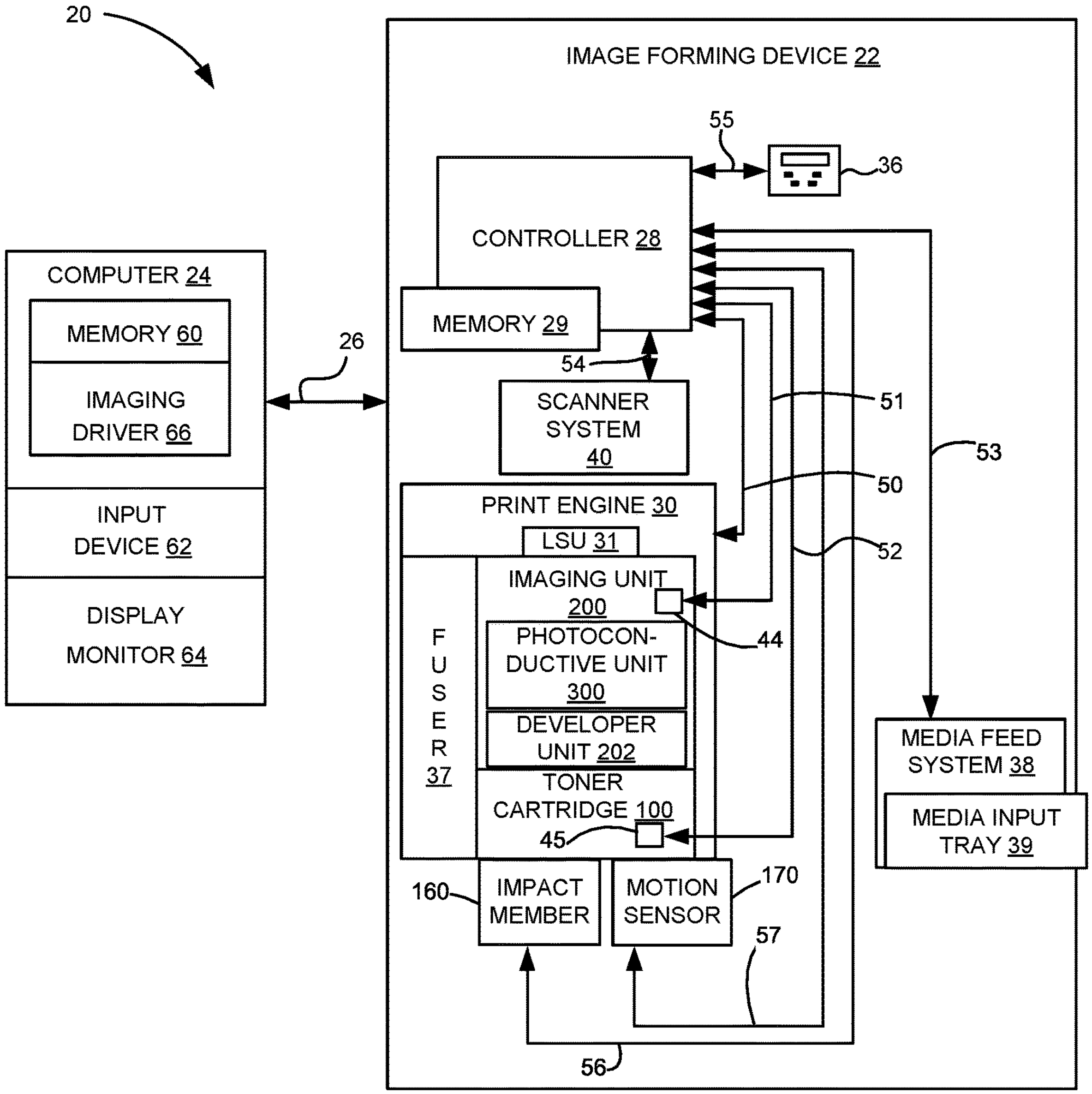
FIG. 1 is a block diagram of an imaging system according to one example embodiment.

Referring now to the drawings and particularly to FIG. 1, there is shown a block diagram depiction of an imaging system 20 according to one example embodiment. Imaging system 20 includes an image forming device 22 and a computer 24. Image forming device 22 communicates with computer 24 via a communications link 26. As used herein, the term "communications link" generally refers to any structure that facilitates electronic communication between multiple components and may operate using wired or wireless technology and may include communications over the Internet.

In the example embodiment shown in FIG. 1, image forming device 22 is a multifunction machine (sometimes referred to as an all-in-one (AIO) device) that includes a controller 28, a print engine 30, a laser scan unit (LSU) 31, an imaging unit 200, a toner cartridge 100, a user interface 36, a media feed system 38, a media input tray 39, and a scanner system 40. Image forming device 22 also includes an impact member 160 and a motion sensor 170 used for sensing toner in toner cartridge 100 as discussed below. Image forming device 22 may communicate with computer 24 via a standard communication protocol, such as, for example, universal serial bus (USB), Ethernet or IEEE 802.xx. Image forming device 22 may be, for example, an electrophotographic printer/copier including an integrated scanner system 40 or a standalone electrophotographic printer.

Controller 28 includes a processor unit and associated electronic memory 29. The processor may include one or more integrated circuits in the form of a microprocessor or central processing unit and may be formed as one or more application-specific integrated circuits (ASICs). Memory 29 may be any volatile or non-volatile memory or combination thereof, such as, for example, random access memory (RAM), read only memory (ROM), flash memory and/or non-volatile RAM (NVRAM). Memory 29 may be in the form of a separate memory (e.g., RAM, ROM, and/or NVRAM), a hard drive, a CD or DVD drive, or any memory device convenient for use with controller 28. Controller 28 may be, for example, a combined printer and scanner controller.

In the example embodiment illustrated, controller 28 communicates with print engine 30 via a communications link 50. Controller 28 communicates with imaging unit 200 and processing circuitry 44 thereon via a communications link 51. Controller 28 communicates with toner cartridge 100 and processing circuitry 45 thereon via a communications link 52. Controller 28 communicates with media feed system 38 via a communications link 53. Controller 28 communicates with scanner system 40 via a communications link 54. User interface 36 is communicatively coupled to controller 28 via a communications link 55. Controller 28 communicates with impact member 160 via a communications link 56. Controller 28 communicates with motion sensor 170 via a communications link 57. Controller 28 processes print and scan data and operates print engine 30 during printing and scanner system 40 during scanning. Processing circuitry 44, 45 may provide authentication functions, safety and operational interlocks, operating parameters and usage information related to imaging unit 200 and toner cartridge 100, respectively. Each of processing circuitry 44, 45 includes a processor unit and associated electronic memory. As discussed above, the processor may include one or more integrated circuits in the form of a microprocessor or central processing unit and may include one or more application-specific integrated circuits (ASICs). The memory may be any volatile or non-volatile memory or combination thereof or any memory device convenient for use with processing circuitry 44, 45.

Computer 24, which is optional, may be, for example, a personal computer, including electronic memory 60, such as RAM, ROM, and/or NVRAM, an input device 62, such as a keyboard and/or a mouse, and a display monitor 64. Computer 24 also includes a processor, input/output (I/O) interfaces, and may include at least one mass data storage device, such as a hard drive, a CD-ROM and/or a DVD unit (not shown). Computer 24 may also be a device capable of communicating with image forming device 22 other than a personal computer such as, for example, a tablet computer, a smartphone, or other electronic device.

In the example embodiment illustrated, computer 24 includes in its memory a software program including program instructions that function as an imaging driver 66, e.g., printer/scanner driver software, for image forming device 22. Imaging driver 66 is in communication with controller 28 of image forming device 22 via communications link 26. Imaging driver 66 facilitates communication between image forming device 22 and computer 24. One aspect of imaging driver 66 may be, for example, to provide formatted print data to image forming device 22, and more particularly to print engine 30, to print an image. Another aspect of imaging driver 66 may be, for example, to facilitate collection of scanned data from scanner system 40.

In some circumstances, it may be desirable to operate image forming device 22 in a standalone mode. In the standalone mode, image forming device 22 is capable of functioning without computer 24. Accordingly, all or a portion of imaging driver 66, or a similar driver, may be located in controller 28 of image forming device 22 so as to accommodate printing and/or scanning functionality when operating in the standalone mode.

Print engine 30 includes laser scan unit (LSU) 31, toner cartridge 100, imaging unit 200 and a fuser 37, all mounted within image forming device 22. Imaging unit 200 is removably mounted in image forming device 22 and includes a developer unit 202 that houses a toner sump and a toner development system. In one embodiment, the toner development system utilizes what is commonly referred to as a single component development system. In this embodiment, the toner development system includes a toner adder roll that provides toner from the toner sump to a developer roll. A doctor blade provides a metered uniform layer of toner on the surface of the developer roll. In another embodiment, the toner development system utilizes what is commonly referred to as a dual component development system. In this embodiment, toner in the toner sump of developer unit 202 is mixed with magnetic carrier beads. The magnetic carrier beads may be coated with a polymeric film to provide triboelectric properties to attract toner to the carrier beads as the toner and the magnetic carrier beads are mixed in the toner sump. In this embodiment, developer unit 202 includes a magnetic roll that attracts the magnetic carrier beads having toner thereon to the magnetic roll through the use of magnetic fields. Imaging unit 200 also includes a photoconductive unit 300 that houses a photoconductive drum and a waste toner removal system.

Toner cartridge 100 is removably mounted in imaging forming device 22 in a mating relationship with developer unit 202 of imaging unit 200. An outlet port on toner cartridge 100 communicates with an inlet port on developer unit 202 allowing toner to be periodically transferred from toner cartridge 100 to resupply the toner sump in developer unit 202.

Figure 2:
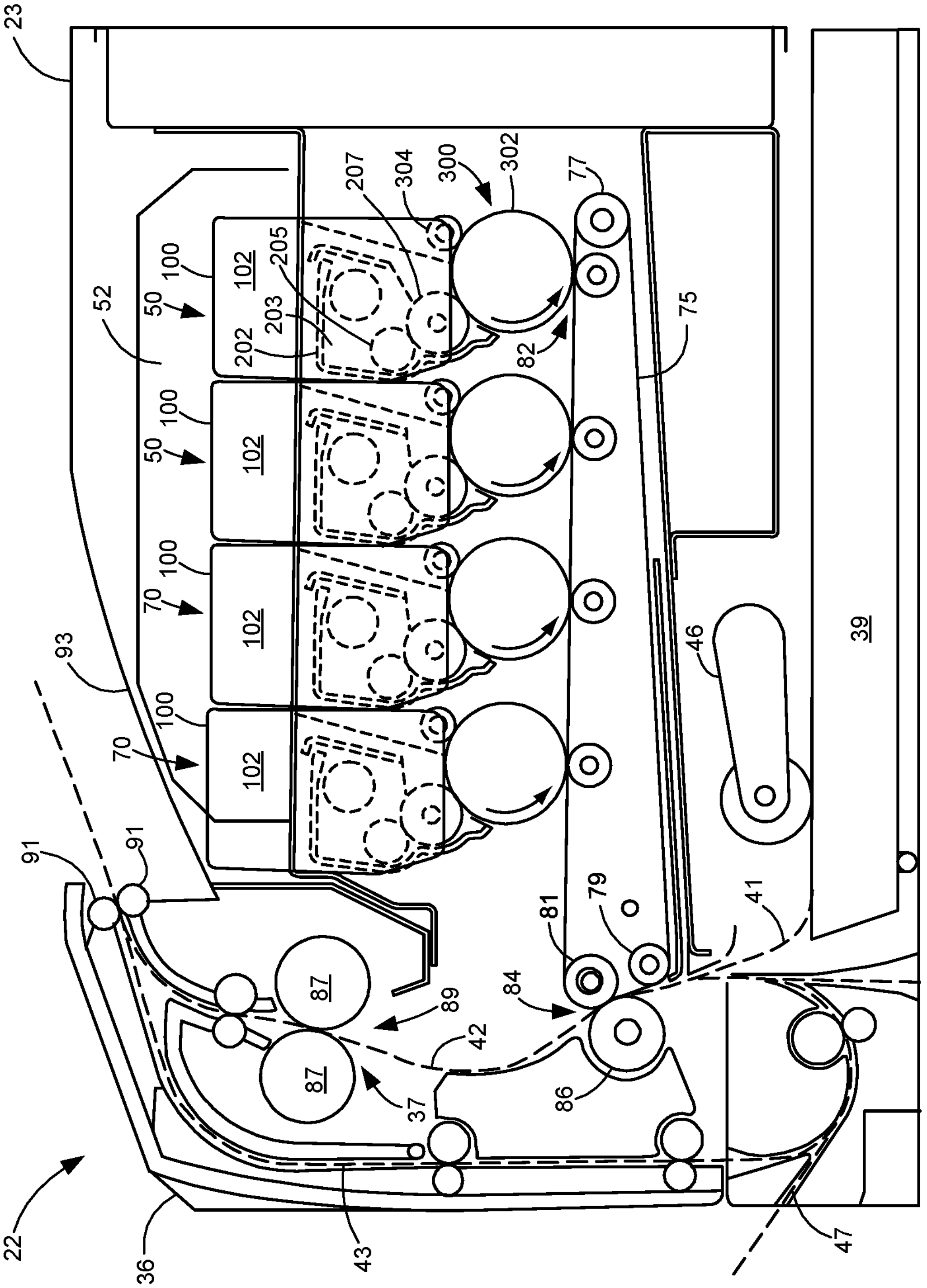
FIG. 2 is a schematic side view of the interior of an image forming device according to one example embodiment.

FIG. 2 illustrates a schematic view of the interior of an example image forming device 22. Image forming device 22 includes a housing 23 including media input tray 39 positioned therein. Media input tray 39 is sized to contain a stack of media sheets. As used herein, the term media is meant to encompass not only paper but also labels, envelopes, fabrics, photographic paper or any other desired substrate. Media input tray 39 is preferably removable for refilling. User interface 36 is shown positioned on housing 23. Using user interface 36, the user is able to enter commands and generally control the operation of image forming device 22. For example, the user may enter commands to switch modes (e.g., color mode, monochrome mode), view the number of pages printed, etc. A media path 41 extends through image forming device 22 for moving the media sheets through the image transfer process. Media path 41 includes a simplex path 42 and may include a duplex path 43. A media sheet is introduced into simplex path 42 from media input tray 39 by a pick mechanism 46. The media sheet is then moved along media path 41 by various transport rollers. Media sheets may also be introduced into media path 41 by a manual feed path 47.

In the example embodiment illustrated, image forming device 22 includes an image transfer section that includes one or more imaging stations 70. Each imaging station 70 includes a toner cartridge 100 and a developer unit 202 mounted on a common photoconductive unit 300. Each toner cartridge 100 includes a reservoir 102 for holding toner and an outlet port in communication with an inlet port of a corresponding developer unit 202 for transferring toner from reservoir 102 to developer unit 202. One or more agitating members may be positioned within reservoir 102 to aid in moving the toner. Each developer unit 202 includes a toner reservoir 203, a toner adder roll 205 that moves toner from reservoir 102 to a developer roll 207. The photoconductive unit 300 includes a charging roll 304 and a photoconductive (PC) drum 302 for each imaging station 70. PC drums 302 are mounted substantially parallel to each other. For purposes of clarity, developer unit 202, PC drum 302 and charging roll 304 are labeled on only one of the imaging stations 70. In the example embodiment illustrated, each imaging station 70 is substantially the same except for the color of toner.

Each charging roll 304 forms a nip with the corresponding PC drum 302. During a print operation, charging roll 304 charges the surface of PC drum 302 to a specified voltage such as, for example, −1000 volts. A laser beam from LSU 31 associated with each imaging station 70 is then directed to the surface of PC drum 302 and selectively discharges those areas it contacts to form a latent image. In one embodiment, areas on PC drum 302 illuminated by the laser beam are discharged to approximately −300 volts. Developer roll 207, which forms a nip with the corresponding PC drum 302, then transfers toner to PC drum 302 to form a toner image. A metering device such as a doctor blade assembly can be used to meter toner onto developer roll 207 and apply a desired charge on the toner prior to its transfer to PC drum 302. The toner is attracted to the areas of PC drum 302 surface discharged by the laser beam from LSU 31.

An intermediate transfer mechanism (ITM) 75 is disposed adjacent to the imaging stations 70. In this embodiment, ITM 75 is formed as an endless belt trained about a drive roll 77, a tension roll 79 and a back-up roll 81. During image forming operations, ITM 75 moves past imaging stations 70 in a clockwise direction as viewed in FIG. 2. One or more of PC drums 302 apply toner images in their respective colors to ITM 75 at a first transfer nip 82. In one embodiment, a positive voltage field attracts the toner image from PC drums 302 to the surface of the moving ITM 75. ITM 75 rotates and collects the one or more toner images from imaging stations 70 and then conveys the toner images to a media sheet at a second transfer nip 84 formed between a transfer roll 86 and ITM 75, which is supported by back-up roll 81. In an alternative embodiment, instead of using an ITM 75 to transfer toner from PC drums 302 to a media sheet, toner is transferred directly from each PC drum 302 to the media sheet as is known in the art.

A media sheet advancing through simplex path 42 receives the toner image from ITM 75 as it moves through the second transfer nip 84. The media sheet with the toner image is then moved along the media path 41 and into fuser 37. Fuser 37 includes fusing rolls or belts 87 that form a nip 89 to adhere the toner image to the media sheet. The fused media sheet then passes through exit rolls 91 that are located downstream from the fuser 37. Exit rolls 91 may be rotated in either forward or reverse directions. In a forward direction, exit rolls 91 move the media sheet from simplex path 42 to an output area 93 of image forming device 22. In a reverse direction, exit rolls 91 move the media sheet into duplex path 43 for image formation on a second side of the media sheet.

Figure 3A:
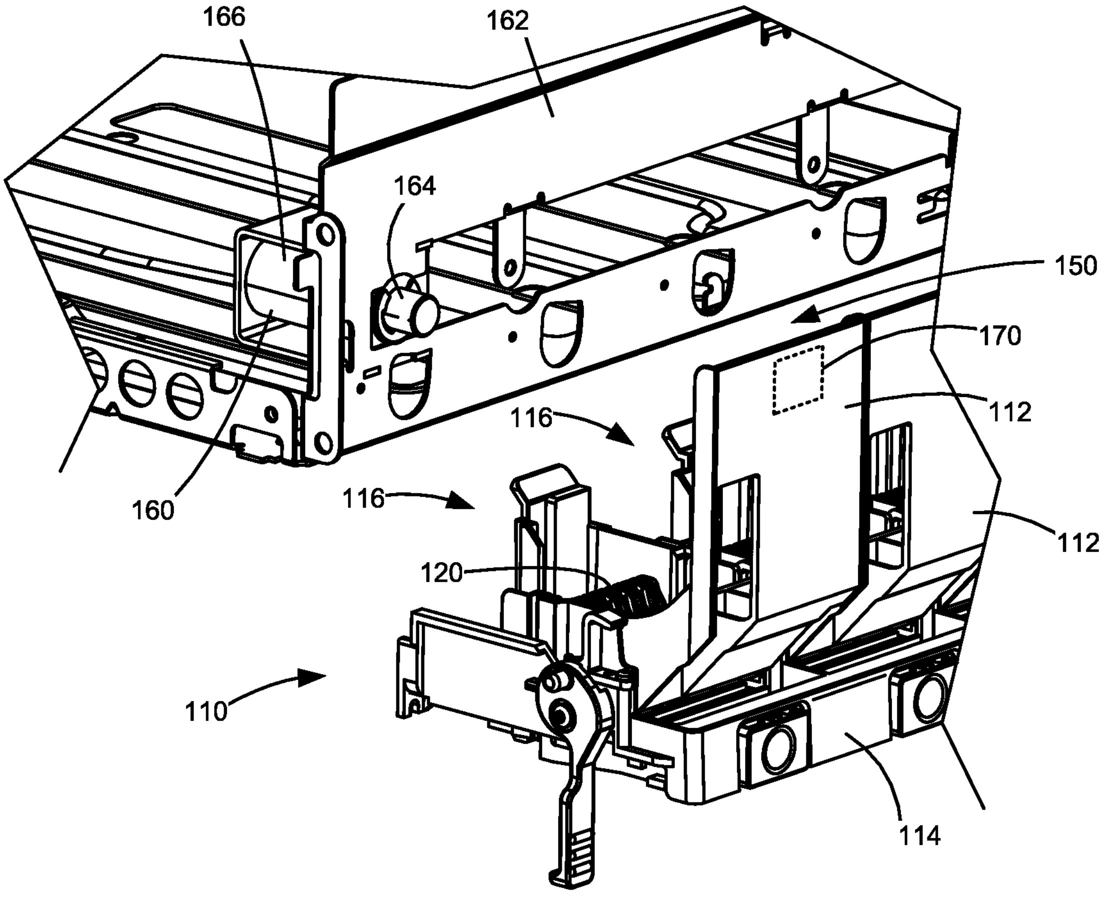
FIGS. 3A and 3B are perspective views of a carriage assembly for holding multiple toner cartridges and a toner level sensing assembly according to one example embodiment.
Figure 3B:
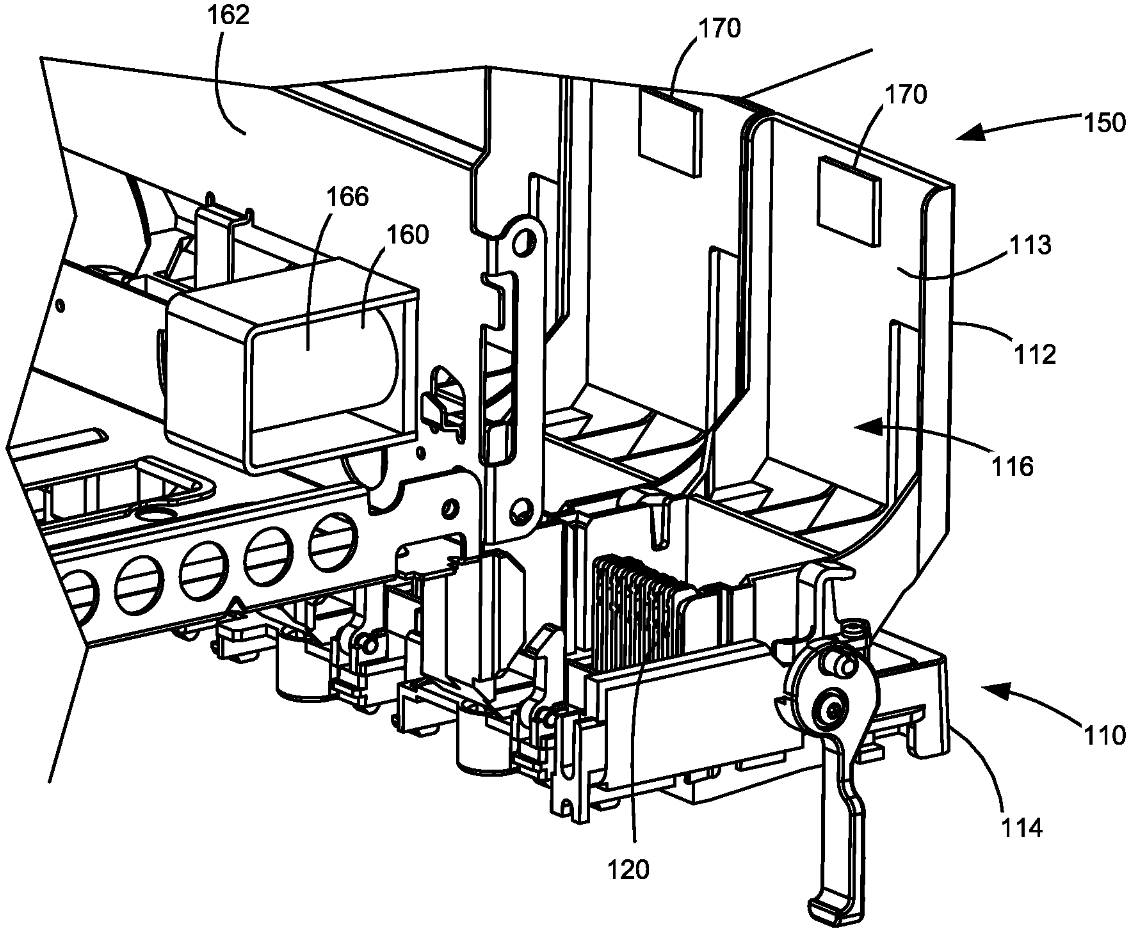

FIGS. 3A and 3B show a carriage assembly 110 having one or more cradles 112 configured to receive and hold one or more toner cartridges 100 in image forming device 22 according to one example embodiment. In FIGS. 3A and 3B, only two cradles 112 can be seen, but carriage assembly 110 may have any number of cradles 112 to hold any number of toner cartridges 100 as desired. In the example embodiment illustrated, cradles 112 are mounted on a common base 114. Each cradle 112 includes a cartridge storage area 116 sized and shaped to receive and hold a toner cartridge 100 having a particular color toner. In the example embodiment illustrated, an electrical connector 120 projects upward from base 114 of carriage assembly 110 for each cradle 112. Electrical connectors 120 each have electrical contacts that mate with electrical contacts 105 (see, for example, FIGS. 4 and 5) of a corresponding toner cartridge 100. Electrical connectors 120 are electrically connected to controller 28 of image forming device 22 such that when electrical contacts 105 of toner cartridge 100 mate with electrical connector 120 of carriage assembly 110 when toner cartridge 100 is installed, the processing circuitry 45 of toner cartridge 100 is able to communicate with controller 28 of image forming device 22.

Image forming device 22 includes a toner level sensing assembly 150 for sensing a toner level within toner cartridge 100. In the embodiment illustrated, toner level sensing assembly 150 includes an impact member 160 and a motion sensor 170. Impact member 160 is configured to impart an impulse force on an installed toner cartridge 100 in order to cause toner cartridge 100 to vibrate. Motion sensor 170 is positioned to detect the motion of toner cartridge 100 in order to determine the amount of toner remaining in reservoir 102 of toner cartridge 100 based on the vibration of toner cartridge 100 as discussed in greater detail below. In the embodiment illustrated, impact member 160 is mounted on a frame 162 of image forming device 22 and is configured to strike an exposed portion of toner cartridge 100 to set toner cartridge 100 into vibration when toner cartridge 100 is installed in image forming device 22. The exposed portion of toner cartridge 100 may, for example, be a feature projecting from the housing of toner cartridge 100 or a portion thereof. Motion sensor 170 is positioned to contact toner cartridge 100 when toner cartridge 100 is installed in image forming device 22 for sensing vibration of toner cartridge 100. In one embodiment, motion sensor 170 is positioned in image forming device 22 adjacent to the housing of toner cartridge 100 when toner cartridge 100 is installed in image forming device 22. In the embodiment illustrated, motion sensor 170 is mounted on an inner side 113 of cradle 112 so as to contact toner cartridge 100 when toner cartridge 100 is installed in cartridge storage area 116 of cradle 112. Motion sensor 170 may be any suitable device capable of detecting motion and/or vibration. For example, motion sensor 170 may be a transducer, such as an accelerometer, capable of converting vibrations and/or motion into electrical signals.

In the embodiment illustrated, impact member 160 is shown including a hammer or plunger 164 that is movable by a solenoid 166 to contact an exposed portion of toner cartridge 100 when toner cartridge 100 is installed. Solenoid 166 is in electronic communication with and activated by controller 28 to move plunger 164 toward or away from toner cartridge 100. In one embodiment, controller 28 is configured to move solenoid 166 in such a manner that plunger 164 imparts an impulse force of relatively short duration to toner cartridge 100 to allow vibration of toner cartridge 100 to occur immediately after impact member 160 strikes toner cartridge 100. For example, solenoid 166 may be controlled such that plunger 164 rebounds immediately after striking toner cartridge 100 so as to reduce the time of contact between plunger 164 and toner cartridge 100 and provide the impulse force to set toner cartridge 100 into vibration.

In other embodiments, other means for imparting an impulse force on toner cartridge 100 may be used as desired. For example, a hammer with an internal loadcell may be used to impart the impulse force on the toner cartridge. In another example, an impulse force generator may utilize a hammer attached to a spring. The hammer may be held in a disengaged position relative to toner cartridge 100 against the biasing force of the spring, such as by using an electromagnet, clamp, or solenoid. When the magnetic hold or clamp hold on the spring is released, the biasing force of the spring causes the hammer to strike and provide the impulse force on toner cartridge 100 to cause toner cartridge 100 to vibrate. In another example, one or more gears of toner cartridge 100 (or one or more gears of image forming device 22 that interface with the gears of toner cartridge 100) may be configured to produce a desired amount of impulse force imparted to toner cartridge 100, such as by jarring the gears.

The placement of impact member 160 in image forming device 22 may be selected to allow impact member 160 to provide an impulse force that causes toner cartridge 100 to vibrate with an initial amplitude of vibration approaching an optimum. For example, impact member 160 may be placed at a location away from features that support and/or hold toner cartridge 100 in place, such as base 114 of cradle 112 or hold-downs that latch toner cartridge 100 in place. Motion sensor 170 may be positioned to contact toner cartridge 100 at a location where an amount of vibration that can be sensed by motion sensor 170 approaches an optimum. For example, motion sensor 170 may be positioned substantially along the main direction of oscillation of toner cartridge 100 when toner cartridge 100 vibrates after receiving the impulse force from impact member 160. In this example, motion sensor 170 may be positioned at a side of toner cartridge 100 opposite the side at which impact member 160 strikes toner cartridge 100. Alternatively, motion sensor 170 may be positioned away from the corners of toner cartridge 100. Motion sensor 170 may also be mounted in a manner that reduces the influence of motion sensor 170 in the rate of decay of vibration of toner cartridge 100. As motion sensor 170 presses against toner cartridge 100 with each oscillation, vibrational energy is partly diminished by an amount that is a function of the force (e.g., frictional interface or resistance) applied by motion sensor 170 against toner cartridge 100. In one example, motion sensor 170 may be placed relatively away from (or not too close to) relatively stiff or rigid areas of toner cartridge 100 in order to permit motion sensor 170 to sense vibration of toner cartridge 100 without greatly contributing to the diminishment of the vibration of toner cartridge 100.

Figure 4:
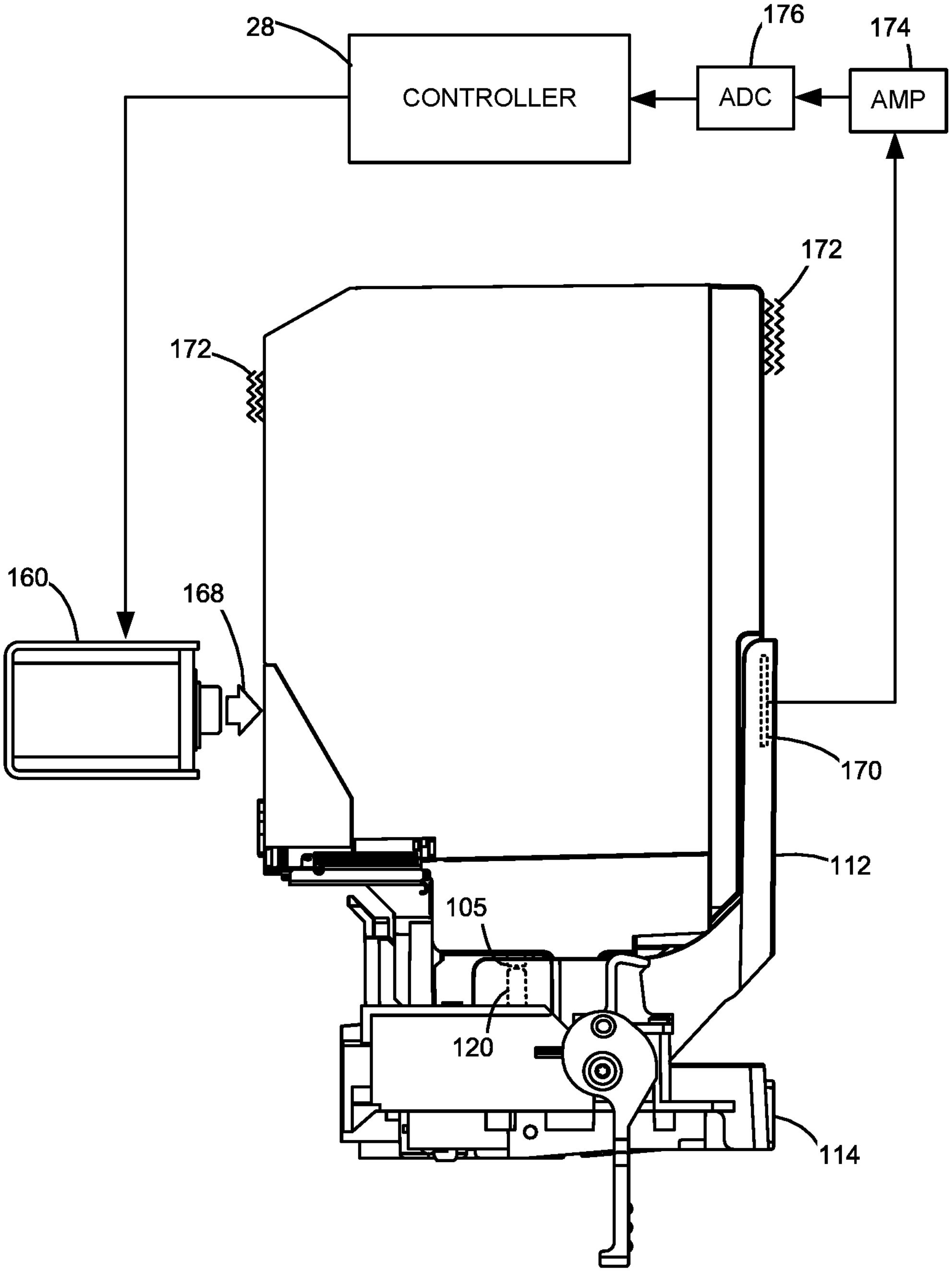
FIG. 4 is a side view showing a toner cartridge and the toner level sensing assembly including an impact member and a motion sensor according to one example embodiment.

With reference to FIG. 4, controller 28 is communicatively coupled to impact member 160 and motion sensor 170 according to one example embodiment. Controller 28 provides control signals to impact member 160 for activating impact member 160 to impart an impulse force 168 of relatively short duration to toner cartridge 100. Impulse force 168 induces motion in toner cartridge 100 in the form of vibration 172. This motion, characterized by acceleration and displacement of toner cartridge 100, is then measured by motion sensor 170 in contact with toner cartridge 100. In this embodiment, motion sensor 170 is in electronic communication with controller 28. In the embodiment illustrated, as toner cartridge 100 vibrates upon receiving impulse force 168 from impact member 160, motion sensor 170 outputs electrical signals that are amplified by an amplification circuit 174. Amplification circuit 174 may employ amplification techniques known in the art, such as by using operational amplifiers. Sample data from motion sensor 170 are obtained by controller 28 as digitized data points from an analog-to-digital convert (ADC) 176 whose input is operatively connected to the output of motion sensor 170 through amplification circuit 174. ADC 176 may be a portion of controller 28 or separate therefrom. Additional circuitries may also be used to convert signals into forms suitable for use by controller 28, impact member 160, and/or motion sensor 170. Controller 28 then determines an estimate of the amount of toner in toner cartridge 100 based on measurements by motion sensor 170.

Figure 5:
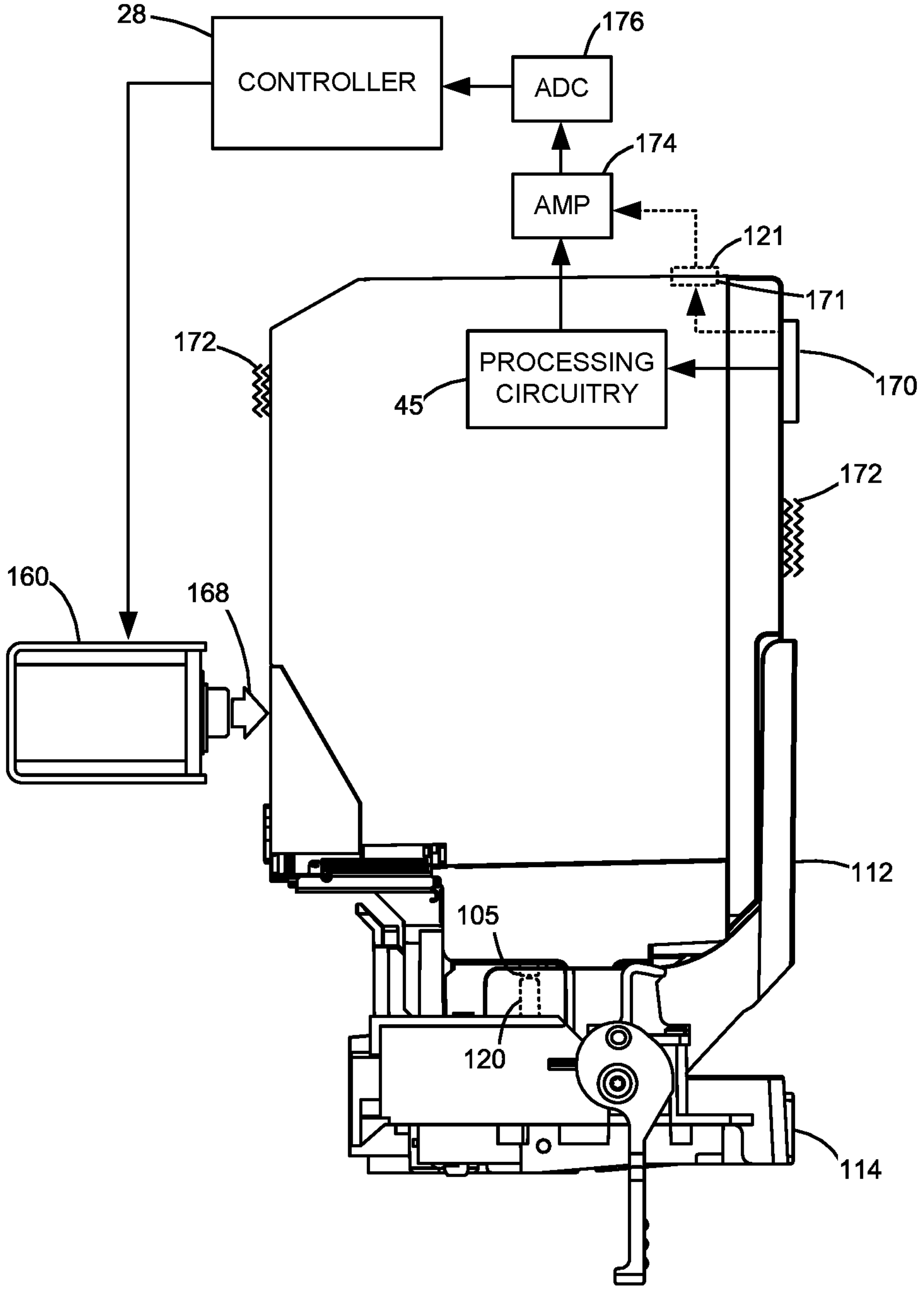
FIG. 5 is a side view showing a toner cartridge and the toner level sensing assembly including an impact member and a motion sensor according to another example embodiment.

In an alternative example embodiment illustrated in FIG. 5, motion sensor 170 may be integrated into toner cartridge 100. In the embodiment illustrated, motion sensor 170 is mounted on an outer surface of toner cartridge 100. In other embodiments, motion sensor 170 may be mounted within the housing of toner cartridge 100. In this embodiment, motion sensor 170 may be in electronic communication with processing circuitry 45 of toner cartridge 100 so that information from motion sensor 170 can be sent to controller 28 of image forming device 22 when electrical contacts 105 of toner cartridge 100 mate with corresponding electrical contacts of electrical connector 120 of cradle 112. Alternatively, motion sensor 170 may have one or more electrical contacts 171 (shown in phantom lines) on the outer surface of toner cartridge 100 that contact corresponding electrical contacts 121 (also shown in phantom lines) in image forming device 22 when toner cartridge 100 is installed in image forming device 22 in order to facilitate communication between motion sensor 170 and controller 28. By integrating motion sensor 170 into toner cartridge 100, tolerance variations in the positioning of motion sensor 170 relative to toner cartridge 100 may be reduced.

The vibrational energy of toner cartridge 100 after impact diminishes at a rate that is a function of toner remaining in toner cartridge 100. As a result, the amount of vibration of toner cartridge 100 may be used to estimate the amount of toner remaining in reservoir 102. Toner level sensing is achieved by controlling impact member 160 to impart impulse force 168 on toner cartridge 100 and using motion sensor 170 to detect vibration of toner cartridge 100. In one embodiment, the amount of vibration of toner cartridge 100 may be determined based on a vibration settling time of toner cartridge 100 after receiving impulse force 168 from impact member 160. In this embodiment, settling time corresponds to a time to achieve a substantially static and/or stable condition of toner cartridge 100 from the time impact member 160 strikes and imparts impulse force 168 on toner cartridge 100. Generally, toner in toner cartridge 100 serves as damping material that reduces the vibration effect on toner cartridge 100 after impact. As a result, the extent of vibration and settling time of toner cartridge 100 in response to receiving impulse force 168 is determined at least in part by the amount of toner in toner cartridge 100. As the amount of toner in toner cartridge 100 decreases, the damping effect induced by toner in toner cartridge 100 is reduced resulting in longer settling time of toner cartridge 100 as toner level decreases. In one example, settling time may be defined as the time it takes for the amplitude of vibration of toner cartridge 100 to fall below a first vibration amplitude threshold after impact member 160 imparts impulse force 168 on toner cartridge 100. An estimate of the amount of toner in reservoir 102 of toner cartridge 100 may be determined based on the settling time of toner cartridge 100 after toner cartridge 100 receives impulse force 168 from impact member 160.

In order to ensure that a sufficient amount of vibration of toner cartridge 100 is achieved to allow measurement by motion sensor 170, the amount of impulse force 168 is selected to provide an initial vibration amplitude of toner cartridge 100 that exceeds a second vibration amplitude threshold greater than the first vibration amplitude threshold when impact member 160 initially strikes toner cartridge 100. For example, a calibration procedure may be performed to determine a control signal for impact member 160 that causes impact member 160 to strike toner cartridge 100 with an impulse force that causes the output of motion sensor 170 to reach the second vibration amplitude threshold. The first and second vibration amplitude thresholds may be predetermined and obtained empirically by performing various tests and measurements on the use of impact member 160, motion sensor 170 and toner cartridge 100, and/or selected depending on desired operational requirements.

Figure 6A:
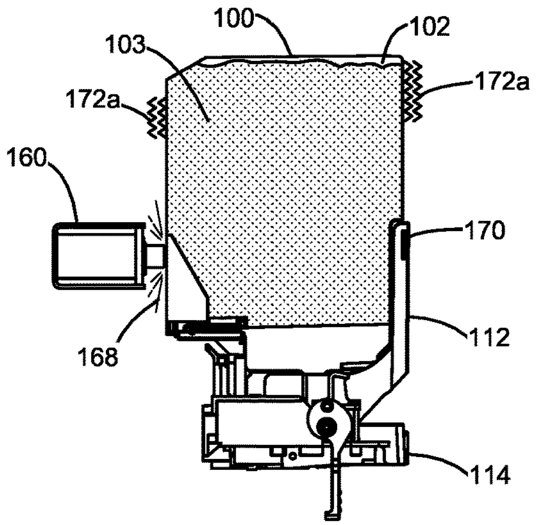
FIGS. 6A-6C are side views showing the toner cartridge having different toner levels according to one example embodiment.
Figure 7A:
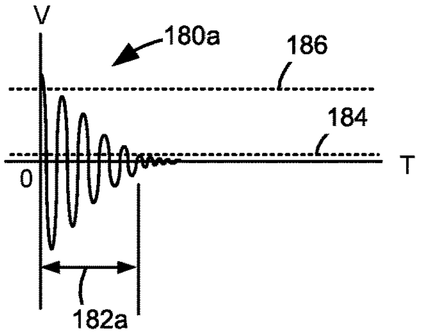
FIGS. 7A-7C illustrate example signal patterns indicating different settling times of the toner cartridge corresponding to the toner levels shown in FIGS. 6A-6C, respectively.
Figure 6B:
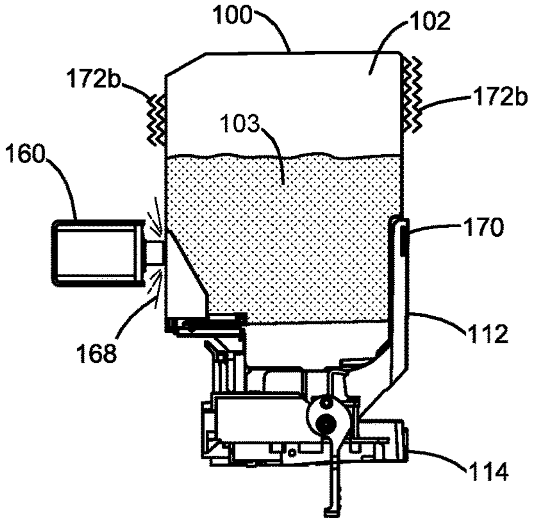
Figure 7B:
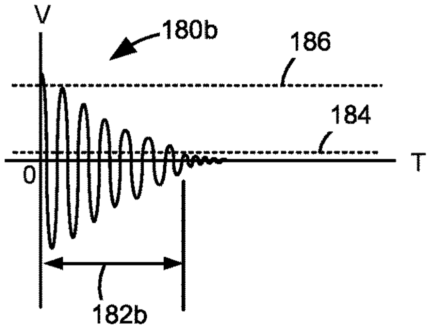
Figure 6C:
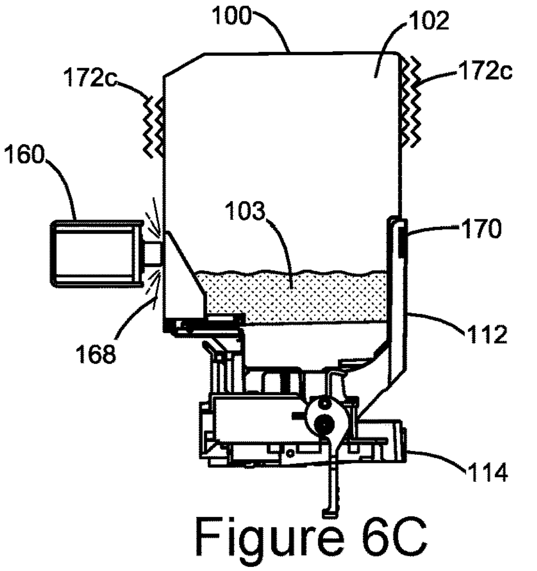
Figure 7C:
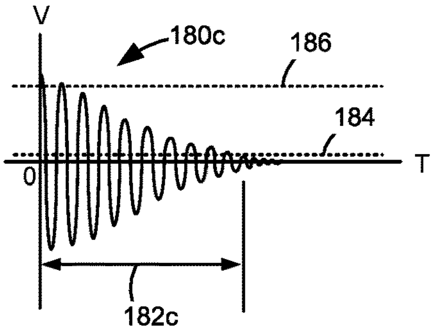

FIGS. 6A-6C depict toner cartridge 100 with different toner levels, and FIGS. 7A-7C illustrate corresponding example signal patterns 180*a*, 180*b*, 180*c* (generally designated as signal patterns 180) indicating different settling times 182*a*, 182*b*, 182*c* (generally designated as settling times 182) for the different toner levels of toner cartridge 100 shown in FIGS. 6A-6C, respectively, as detected by motion sensor 170. Impact member 160 is activated or energized to impart impulse force 168 on toner cartridge 100 and cause vibration 172 of toner cartridge 100. The output of motion sensor 170, indicated by corresponding signal patterns 180 changes as the amplitude of vibration of toner cartridge 100 changes. It is noted that signal patterns 180 are shown for purposes of illustration and do not necessarily represent actual signal patterns. Depending on the amount of toner in toner cartridge 100, settling time 182 varies. In the example shown, settling time 182 is characterized by the time it takes for the amplitude of vibration (in voltage) to fall below first vibration amplitude threshold 184 after toner cartridge 100 receives impulse force 168 indicated by the higher voltage level that exceeds second vibration amplitude threshold 186 at time TO.

The initial vibration amplitude of toner cartridge 100 upon impact may vary depending on the amount of toner in toner cartridge 100. That is, given the same amount of impulse force imparted to toner cartridge 100, less toner in toner cartridge 100 may result in a higher vibration amplitude upon initial impact relative to when toner cartridge 100 contains more toner. In this example, a fixed amount of impulse force may be selected such that the initial vibration amplitude upon impact exceeds the second vibration amplitude threshold regardless of toner level. Alternatively, the impulse force may be adjustable such that the initial vibration amplitude of toner cartridge 100 upon impact at least reaches the second vibration amplitude threshold to allow measurement by motion sensor 170.

When reservoir 102 of toner cartridge 100 is relatively full as shown in FIG. 6A, toner 103 present in reservoir 102 allows toner cartridge 100 to move with less amount of vibration 172*a* resulting in a relatively shorter settling time 182*a*. As toner level in reservoir 102 decreases as shown in FIG. 6B, the damping effect induced by toner 103 is reduced resulting in more vibration 172*b* and an increased settling time 182*b* relative to settling time 182*a*. When the toner level in reservoir 102 is nearly empty, vibration 172*c* of toner cartridge 100 falls below first vibration amplitude threshold 184 after a longer time period resulting in a longer settling time 182*c* relative to settling times 182*a* and 182*b*.

Figure 8:
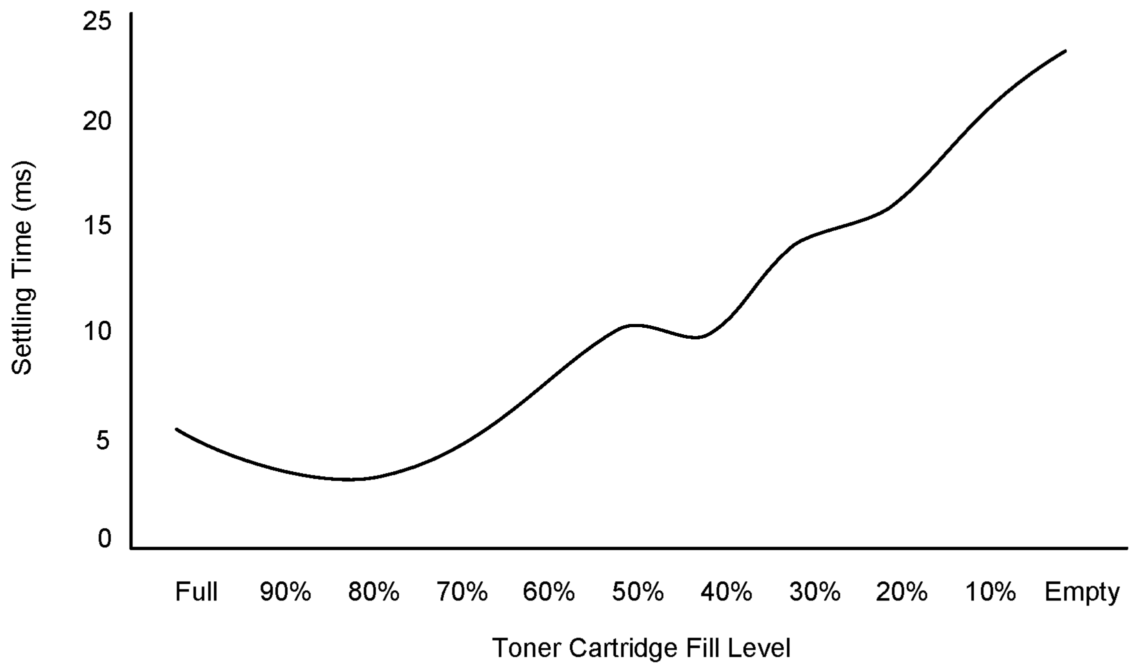
FIG. 8 is a graph illustrating settling time of the toner cartridge versus an amount of toner in the toner cartridge according to one example embodiment.

FIG. 8 is a graph illustrating the settling time (in milliseconds) versus the amount of toner remaining in reservoir 102 (in percentage) over the life of one example embodiment of toner cartridge 100. As shown, the settling time of toner cartridge 100 increases with decreasing toner levels. Although the example graph shows the amount of toner in terms of a percentage of toner relative to the overall volume of reservoir 102, the settling time may be used to determine an amount of toner expressed in other terms as desired, such as, for example, mass of toner (e.g., in grams), volume of toner (e.g., in milliliters) or approximate toner fill level (e.g., full, half-full, near empty, and empty).

Information from motion sensor 170 may be used by controller 28 or processing circuitry in communication with controller 28, such as processing circuitry 45, to determine the amount of toner remaining in reservoir 102. In one embodiment, the initial amount of toner 103 in reservoir 102 is recorded in memory associated with processing circuitry 45 upon filling toner cartridge 100. Accordingly, upon installing toner cartridge 100 in image forming device 22, the processing circuitry determining the amount of toner 103 remaining in reservoir 102 is able to determine the initial toner level in reservoir 102. Alternatively, each toner cartridge 100 for a particular type of image forming device 22 may be filled with the same amount of toner so that the initial toner level in reservoir 102 used by the processing circuitry may be a fixed value for all toner cartridges 100. The toner level in reservoir 102 can be approximated by starting with the initial amount of toner 103 supplied in reservoir 102 and reducing the estimate of the amount of toner 103 remaining reservoir 102 as toner 103 from reservoir 102 is consumed and as information is collected from motion sensor 170.

An empirical relationship between an amount of settling time and an amount of toner remaining in reservoir 102 may be determined for a particular toner cartridge design. In one embodiment, because the amount of vibration tends to provide an analog reading of the toner remaining in reservoir 102, a lookup table may be prepared based on the empirically determined relationship between the settling time and the amount of toner remaining in reservoir 102 such that an estimate of the amount of toner remaining in reservoir 102 may be determined quickly. Alternatively, a polynomial equation may be fit to the empirically determined relationship between the settling time and the amount of toner remaining in reservoir 102. The processing circuitry may continually monitor the settling time and may continually update the estimate of the amount of toner remaining in reservoir 102 over the life of toner cartridge 100 based on the information from motion sensor 170.

In other embodiments, the settling time derived from motion sensor 170 may be used in combination with other operating conditions of image forming device 22 and/or toner cartridge 100 to estimate the amount of toner remaining in reservoir 102. For example, an empirically derived feed rate of toner 103 from reservoir 102 when toner is delivered from toner cartridge 100 to imaging unit 200 may be used to estimate the amount of toner remaining in reservoir 102. The number of printable elements (pels) printed using the color of toner contained in toner cartridge 100 while toner cartridge 100 is installed in image forming device 22 may also be used to estimate the amount of toner remaining in reservoir 102. The settling time derived from motion sensor 170 may be used in combination with these or other measures to estimate the amount of toner remaining in reservoir 102.

Figure 9:
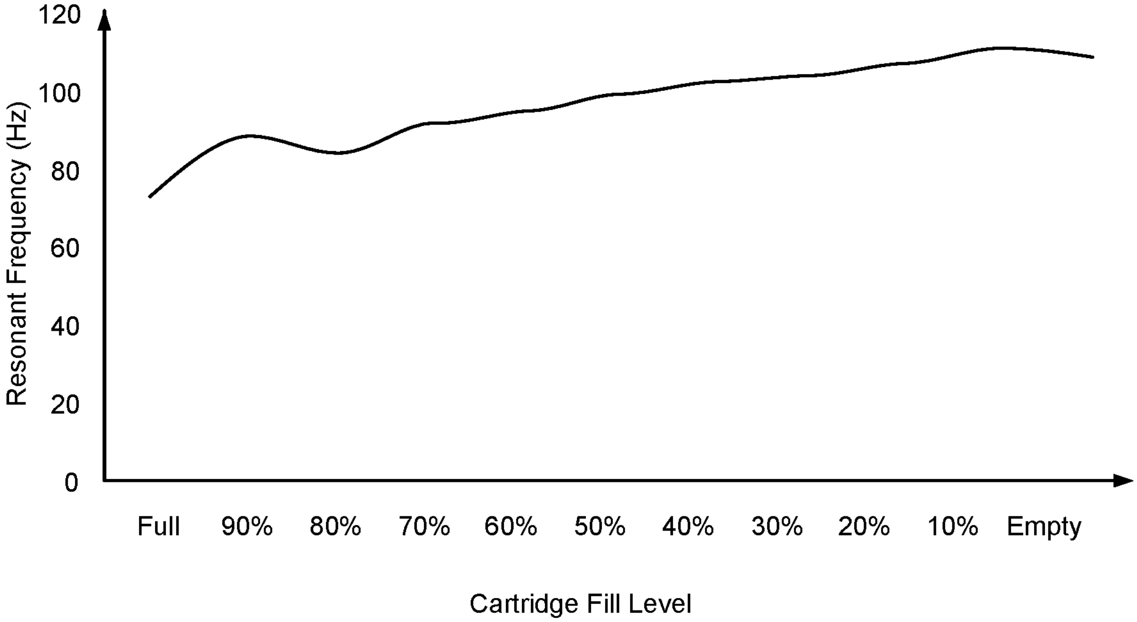
FIG. 9 is a graph illustrating resonant frequency of the toner cartridge versus an amount of toner in the toner cartridge according to another example embodiment.

The use of toner level sensing assembly 150 to determine an estimate of toner remaining in toner cartridge 100 is not limited to the example embodiment discussed above using vibration settling time. For example, as the mass of toner cartridge 100 changes with varying toner levels, the resonant frequency of toner cartridge 100 also changes. Accordingly, the resonant frequency of toner cartridge 100 upon vibration may be used to determine an estimate of toner remaining in toner cartridge 100 according to another example embodiment. An impulse force may be applied to toner cartridge 100 to set toner cartridge 100 into vibration at its resonant frequency and motion sensor 170 may convert the vibrational amplitudes of toner cartridge 100 into electrical signals. Signal processing techniques may be employed to process motion sensor data from the time domain in which it was collected by motion sensor 170 and to convert the motion sensor data into the frequency domain, such as by using a Fast Fourier Transform (FFT). FIG. 9 is a graph illustrating the resonant frequency (in Hz) versus the amount of toner remaining in reservoir 102 (in percentage) over the life of one example embodiment of toner cartridge 100. In the example shown in FIG. 9, the resonant frequency of toner cartridge 100 increases with decreasing toner levels. As discussed above with respect to FIG. 8, although the example graph shown in FIG. 9 expresses the amount of toner in terms of a percentage, the resonant frequency may be used to determine an amount of toner expressed in other terms as desired. Further, as discussed above with respect to settling time, the resonant frequency derived from motion sensor 170 may be used alone or in combination with other conditions or measures to estimate the amount of toner remaining in reservoir 102.

Toner level sensing assembly 150 utilizing vibration to determine an amount of toner within a reservoir may provide an advantage over known methods for toner level sensing which often rely on one or more components positioned within the toner reservoir. Toner level sensing assembly 150, on the other hand, may be implemented in some embodiments solely using components external to the toner reservoir, such as impact member 160 and motion sensor 170. The use of components external to the toner reservoir avoids creating a potential toner leak path. Further, where impact member 160 and motion sensor 170 are positioned in image forming device 22 rather than on the toner container, cost is generally reduced in comparison with adding components to the replaceable toner container.

Although the example embodiments discussed above utilize vibration to determine an amount of toner in the reservoir of a toner cartridge, it will be appreciated that the teachings and concepts provided herein may be used to determine an amount of toner in any reservoir or sump storing toner in image forming device 22 such as, for example, a reservoir of the imaging unit or a storage area for waste toner. Further, although the example embodiments discussed above discuss a system for determining a toner level, it will be appreciated that this system and the methods discussed herein may be used to determine levels or amounts of other consumable materials within a container, such as, for example, particulate materials other than toner (e.g., grain, seed, flour, sugar, salt, etc.), liquids (e.g., distilled spirits within a barrel, liquids such as oils, petrochemicals, or food production ingredients within a drum or other container, etc.), or even fruit ripeness (e.g., watermelon or coconut ripeness).

Although the example embodiment discussed above includes a pair of replaceable units in the form of toner cartridge 100 and imaging unit 200, it will be appreciated that the replaceable unit(s) of the image forming device may employ any suitable configuration as desired. For example, in one embodiment, the main toner supply for the image forming device, the developer unit and the photoconductive unit are housed in one replaceable unit. In another embodiment, the main toner supply for the image forming device and the developer unit are provided in a first replaceable unit and the photoconductive unit is provided in a second replaceable unit. Further, although the example image forming device 22 discussed above includes multiple toner cartridges and corresponding imaging units with each toner cartridge containing a particular toner color (e.g., black, cyan, yellow and magenta) and each imaging unit corresponding with one of the toner cartridges to permit color printing, in the case of an image forming device configured to print in mono, separate replaceable units may be used for a single toner color (e.g., black). For example, in one embodiment, the image forming device includes one toner cartridge and corresponding imaging unit for black toner color.

Further, it will be appreciated that the architectures and shapes of toner cartridge 100, cradle 112, base 114, etc. illustrated in FIGS. 2-6C are merely intended to serve as an example. Those skilled in the art understand that toner cartridges, and other toner reservoirs and image forming device components, may take many different shapes and configurations.

The foregoing description illustrates various aspects of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

The invention claimed is:

1. A system for an electrophotographic image forming device, comprising:

a toner container having a reservoir for storing toner;

an impact member configured to selectively impart an impulse force on the toner container to cause vibration of the toner container;

a sensor configured to sense the vibration of the toner container upon the impact member imparting the impulse force on the toner container; and processing circuitry in communication with the sensor and configured to determine an estimate of an amount of toner in the reservoir based on the sensed vibration of the toner container, wherein the sensor is positioned at a first side of the toner container and the impact member is positioned to impart the impulse force on a second side of the toner container, the first side of the toner container and the second side of the toner container are positioned at opposite ends of the reservoir.

2. The system of claim 1, wherein the impact member is driven by a solenoid.

3. The system of claim 1, wherein the sensor is mounted on the image forming device and positioned to contact the toner container when the toner container is installed in the image forming device.

4. The system of claim 1, wherein the sensor is mounted on the toner container.

5. The system of claim 1, wherein the processing circuitry is configured to determine the estimate of the amount of toner in the reservoir based on a vibration settling time of the toner container.

6. The system of claim 1, wherein the processing circuitry is configured to determine the estimate of the amount of toner in the reservoir based on a resonant frequency of the toner container upon vibration.

7. A toner container for an electrophotographic image forming device, comprising:

a housing having a reservoir for storing toner, the housing has an engagement surface for receiving an impulse force from an impact member of the image forming device when the toner container is installed in the image forming device;

a sensor positioned on the housing and configured to sense vibration of the housing upon the housing receiving the impulse force from the impact member of the image forming device, the sensed vibration of the housing being indicative of an amount of toner in the reservoir; and an electrical contact electrically connected to the sensor and positioned on the housing, the electrical contact is positioned to engage a corresponding electrical contact of the image forming device when the toner container is installed in the image forming device to allow the sensor to transmit an electrical signal corresponding to the sensed vibration to processing circuitry of the image forming device upon the housing receiving the impulse force from the impact member of the image forming device, wherein the sensor is positioned at a first side of the housing and the engagement surface is positioned at a second side of the housing, the first side of the housing and the second side of the housing are positioned at opposite ends of the reservoir.

8. The toner container of claim 7, wherein the sensor includes an accelerometer.

9. A method for estimating an amount of toner in a toner reservoir of a toner container of an electrophotographic image forming device, comprising:

selectively generating an impulse force to cause vibration of the toner container;

sensing, by a sensor, the vibration of the toner container; and determining, by processing circuitry, an estimate of the amount of toner in the toner reservoir of the toner container based on the sensed vibration of the toner container, wherein the sensing the vibration includes sensing the vibration at a first side of the toner container opposite a second side of the toner container at which the impulse force is generated, the first side of the toner container and the second side of the toner container being positioned at opposite ends of the toner reservoir of the toner container.

10. The method of claim 9, wherein the determining the estimate of the amount of toner includes determining the estimate of the amount of toner based on a vibration settling time of the toner container.

11. The method of claim 9, wherein the determining the estimate of the amount of toner includes determining the estimate of the amount of toner based on a resonant frequency of the toner container upon vibration.

* * * * *